US 11,203,327 B2

(12) United States Patent
Houssat et al.

(10) Patent No.: US 11,203,327 B2
(45) Date of Patent: Dec. 21, 2021

(54) CONNECTING DEVICE BETWEEN A WIPER AND A TERMINAL PART OF A MOTOR ARM

(71) Applicant: Valeo Systèmes d'Essuyage, Le Mesnil Saint Denis (FR)

(72) Inventors: Stéphane Houssat, Issoire (FR); Vincent Gaucher, Issoire (FR); Olivier Jomard, Issoire (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 593 days.

(21) Appl. No.: 15/720,187

(22) Filed: Sep. 29, 2017

(65) Prior Publication Data
US 2018/0086315 A1  Mar. 29, 2018

(30) Foreign Application Priority Data
Sep. 29, 2016 (FR) .................................. 1659356

(51) Int. Cl.
*B60S 1/40* (2006.01)
*B60S 1/38* (2006.01)

(52) U.S. Cl.
CPC .......... *B60S 1/4048* (2013.01); *B60S 1/3849* (2013.01); *B60S 2001/4051* (2013.01); *B60S 2001/4054* (2013.01)

(58) Field of Classification Search
CPC ........ B60S 1/40; B60S 1/3849; B60S 1/4006; B60S 1/4038; B60S 1/4045; B60S 1/4048; B60S 2001/4051; B60S 2001/4054
USPC .................................................. 15/250.32
See application file for complete search history.

(56) References Cited

U.S. PATENT DOCUMENTS

| 2005/0177970 A1* | 8/2005 | Scholl ................... B60S 1/3849 |
| | | 15/250.32 |
| 2011/0247166 A1* | 10/2011 | Depondt ................. B60S 1/387 |
| | | 15/250.32 |

FOREIGN PATENT DOCUMENTS

| DE | 102010003269 A1 | 9/2011 |
| FR | 2 890 925 A1 | 3/2007 |
| FR | 3026074 A1 | 3/2016 |
| WO | WO-2014131903 A2 * | 9/2014 ............ B60S 1/4048 |
| WO | 2014/131903 A3 | 10/2014 |

OTHER PUBLICATIONS

Preliminary Search Report and Written Opinion issued in corresponding French Application No. 1659356, dated Jun. 6, 2017 (6 pages).

* cited by examiner

*Primary Examiner* — Gary K. Graham
(74) *Attorney, Agent, or Firm* — Osha Bergman Watanabe & Burton LLP (57) ABSTRACT

The invention relates to a connecting device intended to connect a wiper to a motor arm of the wiper, comprising at least one connector (7) configured to be securely attached to the wiper and an adapter (6) intended to be received in a terminal part of the motor arm, the adapter (6) comprising an attachment device (13) which can move in rotation and is intended to immobilise the adapter (6) in relation to the terminal part at least longitudinally, characterized in that the connecting device comprises a first device (41) limiting the mobility of the attachment device (13) in a first direction of rotation (43) and a second device (42) limiting the mobility of the attachment device (13) in a second direction of rotation (44) opposite the first direction of rotation (43).

19 Claims, 4 Drawing Sheets

CONNECTING DEVICE BETWEEN A WIPER AND A TERMINAL PART OF A MOTOR ARM

This invention relates to the field of wipers for motor vehicles. It more particularly relates to a connecting device connecting a wiper to a motor arm.

Motor vehicles are currently equipped with wipers to wipe glass surfaces, particularly the front windscreens or rear windows of a vehicle, and to prevent the driver's view of his environment from being disturbed. These wipers conventionally comprise elongated wipers which carry scraper blades made of an elastic material driven in movement by a wiper holding arm to which they are attached by an appropriate connecting device. The wiper holding arm is itself connected to a drive device which moves it in an angular back and forth movement. The scraper blades rub against the glass surface and remove water and dirt by carrying them beyond the driver's field of view.

The connecting device connects the wiper to the motor arm allowing a degree of freedom in rotation between these two components. This connecting device also ensures that there is movement between the wiper and the motor arm, so that the wiper can be replaced when it has become worn.

Document WO2014/131903A3 discloses such a connecting device which here takes the form of a first adapter connected to the motor arm through a first retaining device, the latter taking the form of a button housed in a hole provided in the motor arm.

This document also discloses a second retaining device which takes the form of a spur connected to the button, the extremity of which comes into contact with an upper face of a second adapter of one piece with the wiper. The angular position between the first adapter and the second adapter determines whether it is possible to activate the button. When this angle is less than 7°, the spur bears against the upper face of the second adapter thus preventing the button from leaving the hole provided in the motor arm.

Although effective, the connecting device described in this document deserves to be improved, particularly as regards the mechanical connection between the wiper and its motor arm, particularly in the case of a longitudinal force. In fact, when the wiper system is driven in rotation at its maximum speed, centrifugal force exerts a large force on the button and this force acts on the button throughout the back and forth movement of the wiper system. There is then a risk of seeing the button escape from the hole provided in the motor arm, thus causing the wiper to be ejected from the vehicle.

Furthermore, the connecting device must also ensure that the button has good mechanical strength in the situation where the connecting device is used in a terminal part of the motor arm which has no inwardly folded edges of the terminal part, which are responsible for taking up vertical forces.

The object of the invention is to at least partly overcome these technical problems using means for locking the button to provide it with an additional function which consists of preventing it from tilting when the wiper experiences both a centrifugal force and a vertical force, both of which are large.

This object is accomplished through a connecting device intended to connect a wiper to a motor arm of the wiper. This connecting device comprises at least one connector configured to be securely attached, for example in an at least isostatic way, to the wiper and an adapter intended to be received in a terminal part of the motor arm. The adapter comprises an attachment device which can move in rotation and is intended to immobilise the adapter in relation to the terminal part at least longitudinally, and advantageously vertically. The connecting device according to the invention also comprises a first device limiting the mobility of the attachment device in a first direction of rotation and a second device limiting the mobility of the attachment device in a second direction of rotation, the second direction of rotation being opposite to the first direction of rotation.

The connecting device according to the invention thus strengthens the mechanical attachment between an adapter and a terminal part of the motor arm by forming stops to movement preventing rotation of the attachment device, at least when the connector experiences vertical forces or longitudinal forces.

The connection device advantageously has at least one of the following characteristics, taken alone or in combination:
- the adapter and the connector are connected by at least a pivot connection having an axis transverse to a longitudinal axis of the adapter;
- the first limiting device limits the mobility of the attachment device when a tensile force is applied to the connector in relation to the terminal part in a direction perpendicular to the transverse axis and passing at least through a member for securing the connector on the wiper. Such a securing member is for example a pair of hooks capable of gripping an element in the structure of the wiper, such as for example one or more stiffening ribs;
- the second limiting device limits the mobility of the attachment device when a tensile force is applied to the connector in relation to the terminal part in a direction perpendicular to the transverse axis and substantially parallel to a longitudinal axis in which the adapter extends;
- the connecting device comprises at least one tab originating from the attachment device on which the first limiting device and the second limiting device are provided;
- the first limiting device is formed of a first side of the tab and by a first surface delimiting the connector;
- the first side extends along a longitudinal axis of the adapter and the first surface is an upper surface of the connector provided alongside the first side. It will be understood here that the first surface and the first side are arranged so as to interfere depending upon the position of the connector and the position of the attachment device;
- the second limiting device is formed by a second side of the tab which is separate from the first side, and by a second surface delimiting the connector which is separate from the first surface of the connector. The first surface and the second surface are in particular convergent. The first side and the second side are for example convergent;
- the second side extends in a plane crossing the longitudinal axis of the adapter, the second surface being a lateral surface of the connector provided alongside the second side. It will be understood here that the second surface and the second side are arranged so as to interfere depending upon the position of the connector and the position of the attachment device;
- the first side of the tab is in contact with the first surface of the connector when the attachment device and a body of the adapter are turned through an angle of at least 3°, in the first direction of rotation. It will be noted that in a second embodiment, the above attachment device takes the form of a rear part of the adapter and the body takes the form of a front part of the adapter;

the second side of the tab is in contact with the second surface of the connector when the attachment device and a body of the adapter are turned through an angle of at least 3°, in the second direction of rotation. It will be noted that in a second embodiment, the above attachment device takes the form of a rear part of the adapter and the body takes the form of a front part of the adapter;

the first side and the second side delimit a depression provided in the tab;

in accordance with a first embodiment, the attachment device comprises at least one tongue articulated on a body of the adapter, and at the end of which an attachment pad is located. Such a tongue is articulated by its intrinsic flexibility or by the use of a hinge connecting the tongue to the body of the adapter;

in accordance with a second embodiment, the attachment device comprises at least a rear part articulated on a body or front part of the adapter, the rear part and the body having a transverse cross section in a "U" shape, the rear part and the body each comprising an upper wall and two side walls originating from the upper wall, an attachment pad emerging from the rear upper wall of the rear part;

at least one lateral wall of the rear part is separated from a lateral wall of the body by at least one space, the rear upper wall of the rear part being connected to a front upper wall of the body by articulation means. Such articulation means is for example a hinge, in particular through elastic deformation of a dedicated zone connecting the rear part to the body;

the attachment pad is configured to grip an upper wall of the terminal part of the motor arm. The attachment pad and the body of the adapter, in particular its upper wall, are configured to sandwich the upper wall of the terminal wall of the motor arm;

the attachment pad comprises a tooth extending in a plane parallel to a plane in which the tongue extends, the tooth and the tongue being configured to be located on either side and each opposite the upper wall of the terminal part of the motor arm. This thus ensures that the adapter is retained vertically in the terminal part;

the attachment pad comprises a tooth extending in a plane parallel to a plane of extension of the rear upper wall delimiting the rear part of the adapter, the tooth and the rear upper wall being configured to be located on either side and each opposite the upper wall of the terminal part of the motor arm. Vertical retention of the adapter in the terminal part is also ensured.

The invention also covers a wiper incorporating a connecting device as described in this document. In such a case, the connector is of one piece with an element of the structure of the wiper.

The invention also extends to a wiper system comprising a wiper as described above and a rotatable motor arm for this wiper, in which the adapter is housed in a terminal part of the motor arm and held at least longitudinally in this terminal part by the attachment device. It will be noted that the terminal part is specific in the meaning that it does not include any means for retaining the adapter vertically, such as for example folded edges. The terminal part therefore has a transverse cross section in the shape of a "U" where a terminal arris of each limb of the "U" is parallel to the upper wall of the "U" from which the limbs originate.

Advantageously, the attachment device is arranged so as to hold the adapter in the terminal part longitudinally and vertically.

The effect of the invention lies in increasing the strength of a mechanical connection between a wiper and a terminal part of the motor arm.

Other characteristics, details and advantages of the invention will be more clearly apparent from a reading of the description provided indicatively below in connection with the following figures:

FIG. 5 is a view in longitudinal and vertical cross section of the adapter shown in FIG. 4, FIGS. 6 and 7 are diagrams illustrating the operation of the devices limiting the mobility of the attachment device used in the first or the second embodiment of the connecting device according to the invention.

It should first of all be noted that although the figures illustrate the invention in a detailed way for its implementation, the said figures may of course be used for better definition of the invention if appropriate.

In the remainder of the description, the terms longitudinal or lateral, above, below, in front of and behind refer to the orientation of the wiper holding arm or wiper with regard to the glass surface which has to be wiped. The longitudinal direction corresponds to the main axis along which the wiper lies, and along which it extends, and the transverse or vertical orientations cross the longitudinal direction. As far as the vertical orientation is concerned, this crosses the longitudinal direction of the wiper perpendicularly in its plane of movement across the glass surface. The transverse orientation corresponds to a direction perpendicular to the longitudinal direction and substantially parallel to the plane of movement of the wiper across the glass surface. The directions identified as being upper or lower and top and bottom orientations correspond to orientations parallel to an axis in which the wiper holding arm is rotated, the term lower containing the surface to be wiped. In the longitudinal direction, the terms outer or inner are to be understood in relation to a pivot point of the wiper on its motor arm, the term inner corresponding to the part where the motor arm and a half-wiper extend, the term outer corresponding to the part where the other half-wiper extends.

Figure 1:
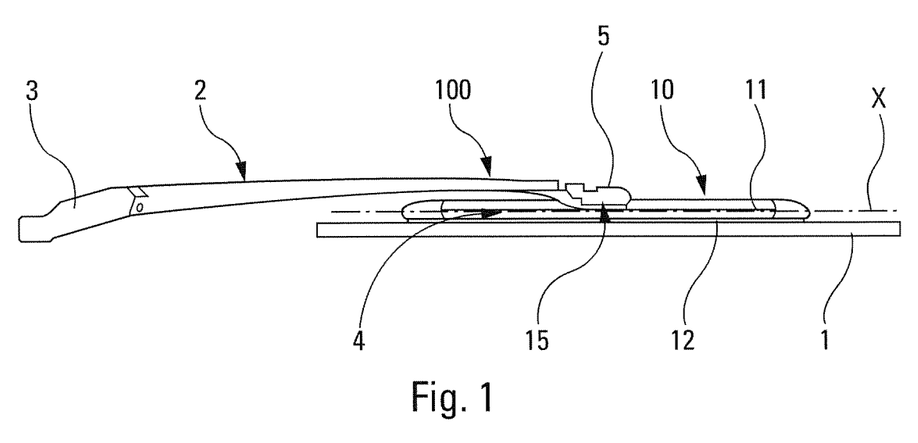
FIG. 1 is a diagrammatical view of a wiper system according to the invention.

With reference to FIG. 1, a motor vehicle is currently fitted with a wiper system 100 to remove water and/or dirt present on a glass surface 1, in particular a rear window or windscreen of a motor vehicle. Wiper system 100 comprises a motor arm 2, also known as a wiper holding arm, which is able to perform an angular back and forth movement across and over the glass surface 1. The bottom of drive 2 may comprise a driver 3 intended to provide a mechanical connection between the motor arm and a shaft (not shown) driving the motor arm 2 in rotation.

Wiper system 100 also comprises a wiper 10 extending along a principal axis referred to as the longitudinal axis or longitudinal direction X. Wiper 10 comprises at least one air deflector 11 and a scraper blade 12 connected to each other by a structure 4 supporting the wiper, the latter then not having any spreaders. Such a structure may be formed of a single stiffening rib, or a plurality of stiffening ribs, or again a support into which one or more stiffening ribs are inserted.

Air deflector 11 is provided to transform a pressure applied by an air flow travelling along the glass surface into a force pressing wiper 10 against the glass surface of the motor vehicle. Scraper blade 12 is the part of wiper 10 in direct contact with the glass surface to remove water and/or dirt present on the latter. Air deflector 11, scraper blade 12 and supporting structure 4 form a semi-rigid assembly which is carried by a connecting device 15 placed between motor arm 2 and wiper 10.

Connecting device 15 provides a mechanical connection between a terminal part 5 of motor arm 2 and wiper 10 and thus makes it possible to separate wiper 10 from motor arm 2 so that wiper 10 can be replaced. In particular, one object of this invention is to provide a connecting device 15 arranged so as to secure the mechanical connection between wiper 10 and the terminal part 5 of motor arm 2, without nevertheless affecting the operation of replacing the wiper. In other words, connecting device 15 according to the invention is particularly suitable for an after-sales market in wipers.

Figure 2:
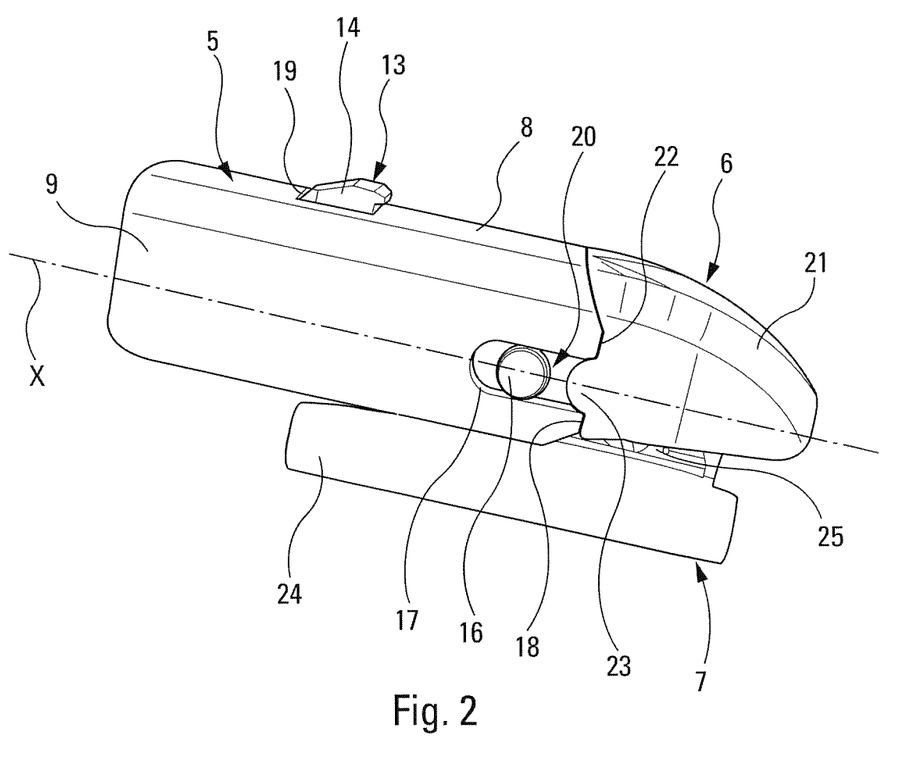
FIG. 2 is a perspective view of a connecting device according to the invention.

In its general form as illustrated in FIG. 2, connecting device 15 according to this invention comprises two parts, an adapter 6 and a connector 7, where adapter 6 is the part housed in the terminal part 5 of motor arm 2.

Connector 7 is suitable for supporting wiper 10 and is mounted rotatably on or in adapter 6. According to one embodiment of the invention, adapter 6 and connector 7 are manufactured by moulding a synthetic material, for example a material from the polyoxymethylenes family, known by the acronym POM, or by moulding a mixture of polymer materials, for example a mixture of polymers of the polycarbonates family and the acrylonitrile-butadiene-styrene family, known by the acronym ABS. Both adapter 6 and connector 7 are preferably each of a single piece. In other words, adapter 6 and connector 7 are both of one piece and can only be divided into several pieces by destroying adapter 6 or connector 7. As for terminal part 5 it is for example manufactured by folding a metal strip, such as a sheet of steel, aluminium, alloy or the like, or by moulding a synthetic material.

Terminal part 5 is provided with an upper wall 8 from which originate two lateral sides 9. Seen in cross section, terminal part 5 has a profile in the shape of a "U". Each of lateral sides 9 terminates in a terminal arris which is parallel to upper wall 8. Each lateral side 9 is provided with a through opening 17 of oblong shape. Each of these openings 17 opens onto a terminal edge 18 forming the end of terminal part 5. Upper wall 8 incorporates an opening 19, for example of rectangular cross section, into which extends attachment pad 14 of an attachment device 13 of adapter 6 in terminal part 5. Attachment device 13 will be described in greater detail below.

Adapter 6 comprises a body 20 delimited by at least an upper face and two lateral sides, so as to be in the shape of a "U" when seen in transverse cross section. A transverse spur 16 is illustrated in FIG. 2. Such a transverse spur 16 can be provided on only one of the lateral sides of body 20, or on each of these lateral sides of body 20. When adapter 6 is assembled with terminal part 5 of the type described here, this spur provides a first engagement and a first form of guidance for this adapter 6 within corresponding opening 17 of terminal part 5.

Adapter 6 also comprises a head 21 extending longitudinally in the extension of body 20, along the longitudinal X axis previously defined. With reference to the directions and orientations previously defined, head 21 extends towards the front of adapter 6, and body 20 extends towards the rear of that same adapter 6. According to this embodiment, head 21 is higher and/or wider than body 20 of adapter 6. Thus a shoulder 22 which acts as a stop for terminal part 5, against which terminal edge 18 abuts when adapter 6 is mounted in terminal part 5 is so formed. According to one embodiment and head 21 has a transverse cross section in the shape of a "U", which, as in the case of body 20, allows a space to be left in which connector 7 can extend and move back and forth in rotation.

Adapter 6 also comprises centring means 23 extending longitudinally from head 21 partly covering a lateral side of body 20. Centring means 23 originates from shoulder 22 and has a curved shape in which the summit of the curve is orientated towards body 20 of adapter 6. This centring means 23 at least partly enters opening or openings 17 and thus performs a function of adjusting and centring adapter 6 in terminal part 5. Such centring means 23 may be formed from a single half-disc originating from a lateral side of body 20. Alternatively, centring means 23 is formed from two half-discs each provided on a lateral side of body 20.

FIG. 2 also shows the presence of connector 7 comprising two subassemblies, of which a first, called the securing member 24, is responsible for attaching connector 7 to a structural element of the wiper, and a second subassembly, referred to as pivot support 25, responsible for ensuring rotation with adapter 6. It will be understood here that pivot support 25 overlies securing member 24 and extends into the space provided by the "U" shape of adapter 6. According to one embodiment, securing member 24 is in the form of two hooks which grip a structural element of the wiper, in particular one or two stiffening ribs.

Figure 3:
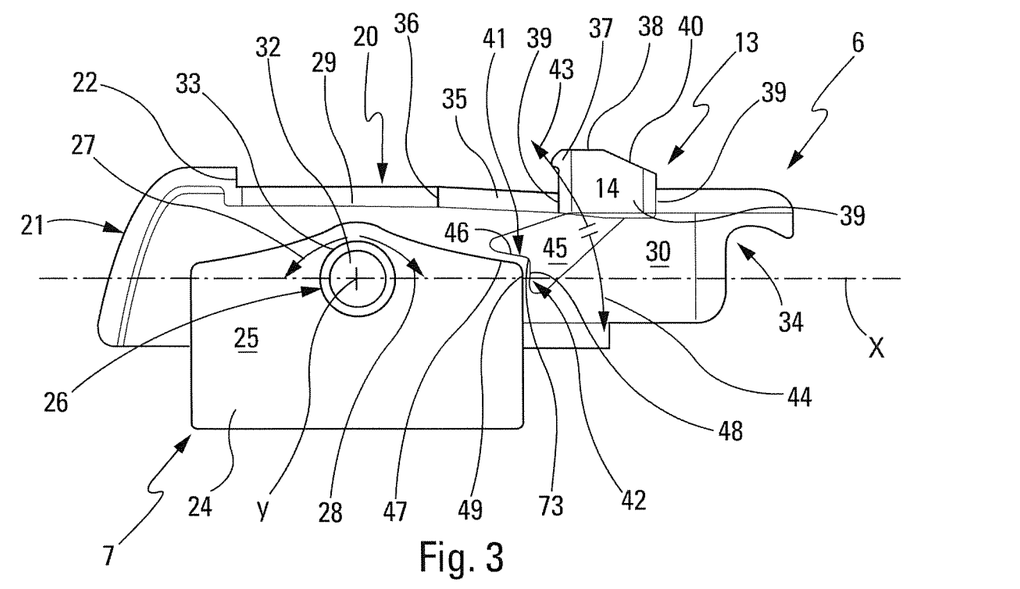
FIG. 3 is a view in longitudinal and vertical cross section of a connecting device according to a first embodiment.

FIG. 3 shows a longitudinal and vertical cross section of connecting device 15 according to a first embodiment. Connector 7 incorporates its securing member 24 above which pivot support 25 extends. A pivot connection 26 is provided between connector 7 and adapter 6 allowing connector 7, to which the structure of the wiper is secured, to turn in two directions of rotation illustrated by the arrows referenced 27 and 28.

Pivot connection 26 comprises for example at least one cylindrical pivot 32 centred on an axis of rotation parallel to an upper wall 29 of body 20, and perpendicular, or substantially perpendicular, to lateral side 30 thereof. Such a pivot 32 extends from at least one lateral side 30 of body 20 of this adapter 6, within the internal volume of the said adapter delimited by upper wall 29 and by the lateral sides of this body. It is of course envisaged that adapter 6 should comprise two coaxial pivots, each located on one lateral side of body 20.

This pivot 32 is advantageously intended to act together with connector 7 associated with the wiper when such a wiper is connected to the adapter. More specifically, this pivot 32 engages a receiving opening 33 provided in connector 7. It should be noted that pivot connection 26 is longitudinally sited between shoulder 22 and a rear longitudinal extremity 34 of adapter 6.

It is also possible to provide that pivot connection 26 should take the form of one or more cylindrical pivots emerging from pivot support 25 and engaging openings provided in the lateral sides of body 20 of adapter 6. It is also possible to construct pivot connection 26 by means of coaxial holes provided in the lateral sides of adapter 6, through a passage provided in pivot support 25, combined with a metal shaft extending through the coaxial holes and into the passage.

Adapter 6 of the connecting device according to the invention comprises attachment device 13 whose function is to attach adapter 6 to the terminal part of the motor arm. This attachment device 13 ensures that adapter 6 is held mechanically along longitudinal X axis in relation to the terminal part of the motor arm, but it may also ensure that adapter 6 and the terminal part of the motor arm are mechanically held in a vertical direction, that is to say perpendicularly to a plane passing through the two hooks of securing member 24.

This attachment device 13 can move in rotation in relation to body 20 of the adapter by means of a hinge 36. In accordance with the embodiment illustrated in FIGS. 3 to 5, attachment device 13 is deflected about an axis 56 passing through hinge 36 and upper wall 29 of body 20 of adapter 20. This deflection is brought about through elastic deformation of the material constituting the hinge.

Attachment device 13 further comprises attachment pad 14, otherwise referred to as a button. This attachment pad 14 emerges above upper wall 29 of body 20. In other words, attachment pad 14 overlies upper wall 29 by being placed above a plane formed by the latter. Attachment pad 14 is shaped so as to become engaged within opening 19 made in the terminal part 5 of motor arm 2, as illustrated in FIG. 2. Attachment pad 14 comprises a tooth 37 which overlies and extends above upper wall 29. Such a tooth 37 forms a rim projecting from attachment pad 14 which extends longitudinally towards the front of adapter 6, that is to say towards head 21. In other words, tooth 37 of attachment pad 14 forms a projection.

Attachment pad 14, in particular its tooth 37, is arranged so as to grip a thickness of the upper wall 8 of terminal part 5 of motor arm 3, as may be seen in FIG. 2, in combination with tongue 35 and/or with upper wall 29 of body 20. It will be noted that one length of attachment pad 14 not including its tooth 37, when measured along the longitudinal X direction, is shorter than a length of opening 19, measured in the same direction. Thus button 16 together with its tooth 17 can pass through opening 90.

Attachment pad 14 is of generally rectangular shape, defined by an upper face 38 from which originate four side walls referenced 39. In accordance with one useful aspect of attachment pad 14, the latter comprises an inclined section 40 connecting upper face 38 with at least one side wall 39, in particular that facing and closest to longitudinal extremity 34 of adapter 6. Such an inclined section 40 makes it easier to insert attachment pad 14 into the opening of the terminal part of the motor arm.

No matter how it is constructed, connecting device 15 according to the invention comprises a first device 41 limiting the mobility of attachment device 13 and a second device 42 limiting the mobility of attachment device 13. Each of devices 41, 42 limiting the mobility of attachment device 13 has the function of preventing movement of attachment device 13 when the wiper is subject to particular forces. First limiting device 41 thus forms means blocking deflection of attachment device 13 when the latter is deflected in a first direction of rotation 43, while second limiting device 42 forms means blocking the deflection of attachment device 13 when the latter is deflected in a second direction of rotation 44, this second direction of rotation 44 being opposite the first direction of rotation 43.

According to one embodiment which may be seen in FIGS. 3 to 7, first limiting device 41 and second limiting device 42 are both formed on a same tab 45 projecting from attachment device 13. More specifically, this tab 45 emerges from a lower face of attachment pad 14, this lower face facing the internal "U"-shaped volume delimited by the upper wall and lateral sides of body 20. This tab 45 extends in a longitudinal and vertical plane of adapter 6. In one embodiment, the longitudinal plane in which tab 45 lies is a transversely median plane. Alternatively, the invention also covers the situation in which first limiting device 41 and second limiting device 42 are formed of elements which are separate from each other, provided that these devices fulfil their function of limiting movement.

According to one embodiment, first limiting device 41 is formed by a first side 46 of tab 45 and by a first surface 47 delimiting connector 7. First side 46 is an edge or arris delimiting tab 45. First surface 47 is an upper surface of pivot support 25, such a surface extending overall opposite upper wall 29 of body 20 so as to lie alongside first side 46, when adapter 6 is mounted on connector 7. It will be noted that first side 46 extends along the longitudinal X axis and the transverse Y axis of adapter 6.

Second limiting device 42 is for example formed by a second side 48 of tab 45 which is separate from first side 46, in the meaning that it extends along a plane intersecting the plane in which first side 46 extends. Second side 48 extends in a plane crossing the longitudinal X axis of adapter 6. This second limiting device 42 also comprises a second surface 49 delimiting connector 7 which is separate from first surface 47 of the connector, forming an angle in relation to the latter. Second surface 49 is here a lateral surface of connector 7 facing second side 48. Second surface 49 is more specifically formed on pivot support 25 and connects first surface 47 to securing member 24 of connector 7.

According to the first embodiment, attachment device 13 comprises a tongue 35, which is in particular flexible, extending between hinge 36 and attachment pad 14, the latter being formed at a longitudinal extremity of tongue 35. This tongue 35 is separated from upper wall 29 of body 20 by two slots extending longitudinally and is advantageously flat. According to the embodiment illustrated in FIG. 3, hinge 36 is located between attachment pad 14 and head 21 of the adapter. The invention also covers the situation where attachment device 13 is reversed, that is to say a situation in which the hinge is located between attachment pad 14 and longitudinal extremity 34 of body 20. In such a situation, the shape and position of the first limiting device and the second limiting device will be adapted without going beyond the scope of the invention.

Figure 4:
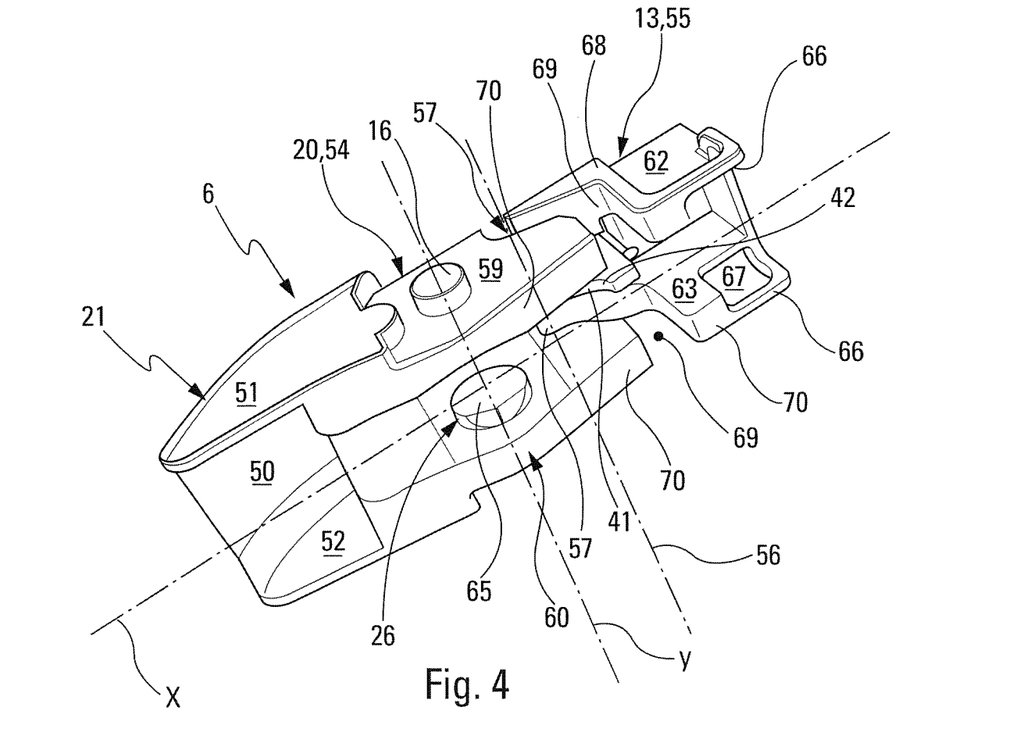
FIG. 4 is a perspective view of an adapter used in a connecting device according to a second embodiment.

FIG. 4 illustrates the second embodiment of the connecting device. The connector is identical or similar to that in the first embodiment and reference will be made to the description of this first embodiment for its implementation. Adapter 6 is here the one illustrated in FIG. 2. Head 21 has an upper wall 50 from which extend two side walls 51 and 52 extending transversely to upper wall 50 of head 21.

Figure 5:
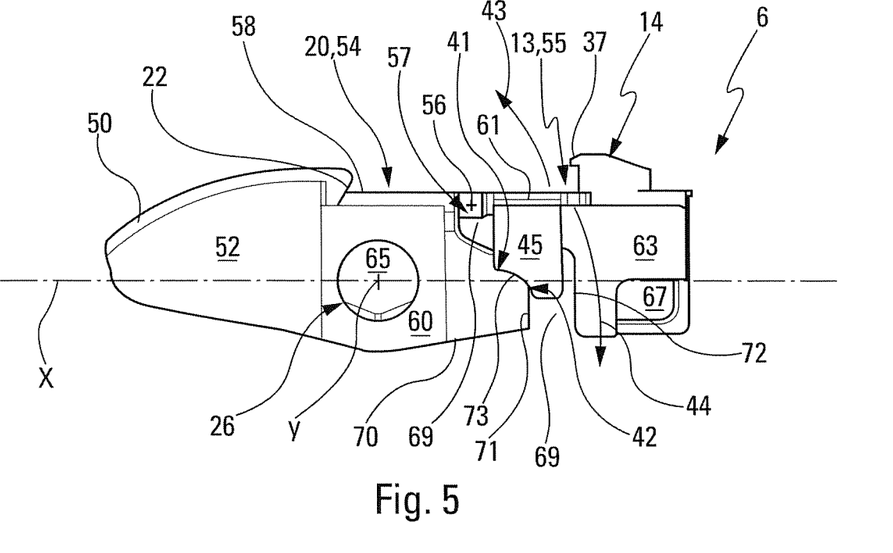

With reference to FIGS. 4 and 5, adapter 6 extends along the longitudinal X axis and comprises a front part 54 and an attachment device 13 located at the rear of adapter 6. Front part 54 and attachment device 13 are articulated to each other. From a functional point of view, front part 54 is comparable to body 20 in the first embodiment. Attachment device 13 is formed by a rear part 55 of adapter 6.

Front part 54 and rear part 55 follow one after the other along the longitudinal X axis and are aligned one after the other along this longitudinal X axis. Front part 54 and rear part 55 can move with respect to each other about the axis of articulation 56 which is at right angles to the longitudinal X axis, to the vertical axis and parallel to the transverse Y axis. In other words, front part 54 and rear part 55 are mounted so as to tilt with respect to each other about the axis of articulation 56. Front part 54 and rear part 55 are connected together by articulation means 57, functionally comparable to hinge 36 in the first embodiment. This articulation means 57 is placed between front part 54 and rear part 55 and forms a flexible connection between front part 54 and rear part 55.

Front part 54 forms a reference point which is fixed with regard to rear part 55, the latter being the portion of adapter 6 which turns about front part 54 through articulation means 57.

Front part 54 and rear part 55 each have a transverse profile in the shape of a "U". In other words, in transverse cross section, front part 54 and rear part 55 of adapter 6 are both in the shape of a "U". Front part 54 thus comprises a front upper wall 58 forming the base of the "U" and two front side walls 59 and 60, in particular parallel or substantially parallel to each other and at right angles or substantially at right angles to front upper wall 58 forming the limbs of the "U". As far as rear part 55 is concerned, this comprises a rear upper wall 61 forming the base of the "U" and two rear side walls 62 and 63, which are substantially parallel to each other and substantially at right angles to rear upper wall 61, which form the limbs of the "U".

Adapter 6 comprises pivot connection 26 which is arranged to connect adapter 6 to connector 7 by permitting one to rotate about the other about the transverse Y axis. In general, this pivot connection 26 is provided on or in front part 54 of adapter 6. Pivot connection 26 may be formed of a pair of pivots emerging into the internal volume of adapter 6. It may also be in the form of bearings provided in front side walls 59, 60. The pivot connection may also be formed by a pair of pivots emerging from front side walls 59 and 60, extending towards the exterior of adapter 6. Pivot connection 26 may finally be constructed using a combination of these examples, or by using a metal shaft as mentioned in the description of the pivot connection in relation to the first embodiment.

Advantageously, pivot connection 26 is located on adapter 6 longitudinally between head 21 and articulation means 57.

Front upper wall 58 and rear upper wall 61 are advantageously connected together by means of articulation 57. In other words, articulation means 57 is placed between front upper wall 58 and rear upper wall 61, particularly exclusively between upper walls.

Rear part 55 of adapter 6 comprises at least one hoop 66 provided in one of the rear lateral sides 62, 63, this hoop surrounding a hole 67, for example a through hole, made in the lateral side bearing hoop 66. Advantageously, each rear lateral side comprises a hoop 66 and a hole 67. A portion of lateral side 62 or 63 is set back towards the interior of the adapter, forming a flange 68, of which hoop 66 is a part, on the rear lateral side.

Front lateral walls 59, 60 of front part 54 and rear lateral walls 62, 63 of rear part 55 are separated from each other by a space 69 extending between articulation means 57 and a lower edge 70 of adapter 6. Lower edge 70 is formed from the lower extremity of the front lateral walls and rear lateral walls, this lower edge 70 being located opposite front upper wall 58 and rear upper wall 61. Space 69 allows the front lateral walls and rear lateral walls to move together or apart during a tilting movement between front part 54 and rear part 55 about articulation means 57. In other words, when front part 54 and/or rear part 55 tilts about articulation means 57, a rear rim 71 of front part 54 and a front rim 72 of rear part 55 are capable of approaching each other or moving away from each other as a result of shrinkage or enlargement of space 69. Open space 19 has an "S" shape between lower edge 70 and articulation means 57.

Rear part 55 comprises attachment pad 14 which is identical or similar to that in the first embodiment and reference will be made to the description of that first embodiment for its implementation.

First limiting device 41 and second limiting device 42 are partly illustrated in FIGS. 4 and 5, in the part formed on adapter 6. FIGS. 3 and 5 illustrate the presence of an depression 73 which is delimited by first side 46 and second side 48. This depression forms a curve on tab 45. While tab 45 in the first embodiment illustrated by FIG. 3 extends lengthwise along a straight line inclined towards head 21, tab 45 in the second embodiment extends lengthwise along a straight line perpendicular to rear upper wall 61.

Figure 6:
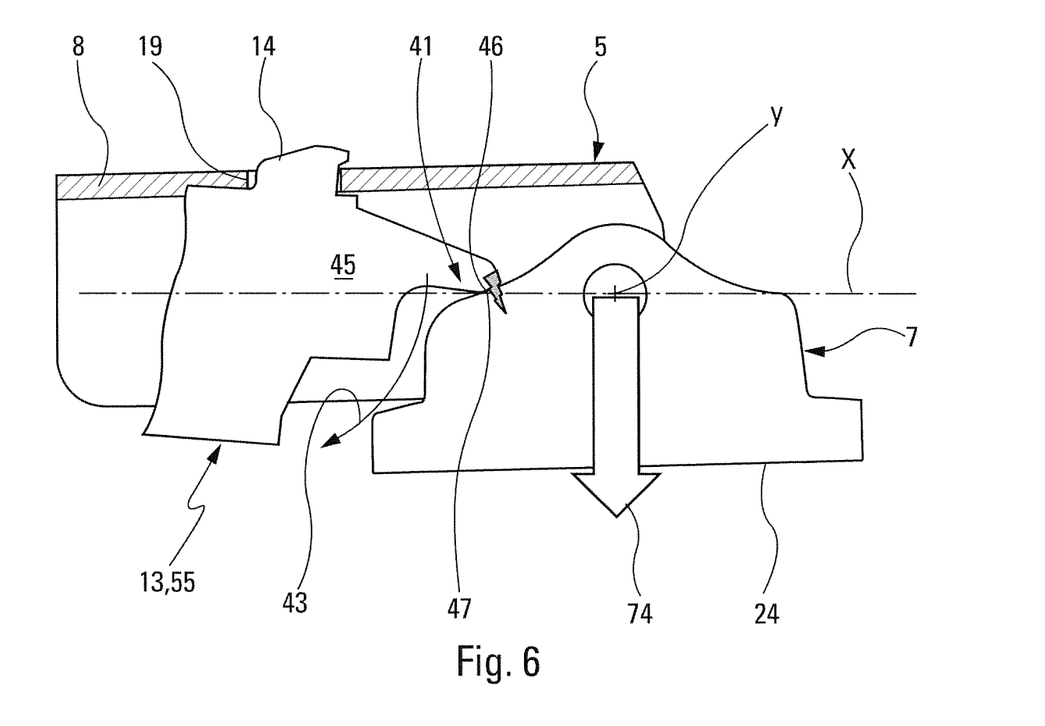
Figure 7:
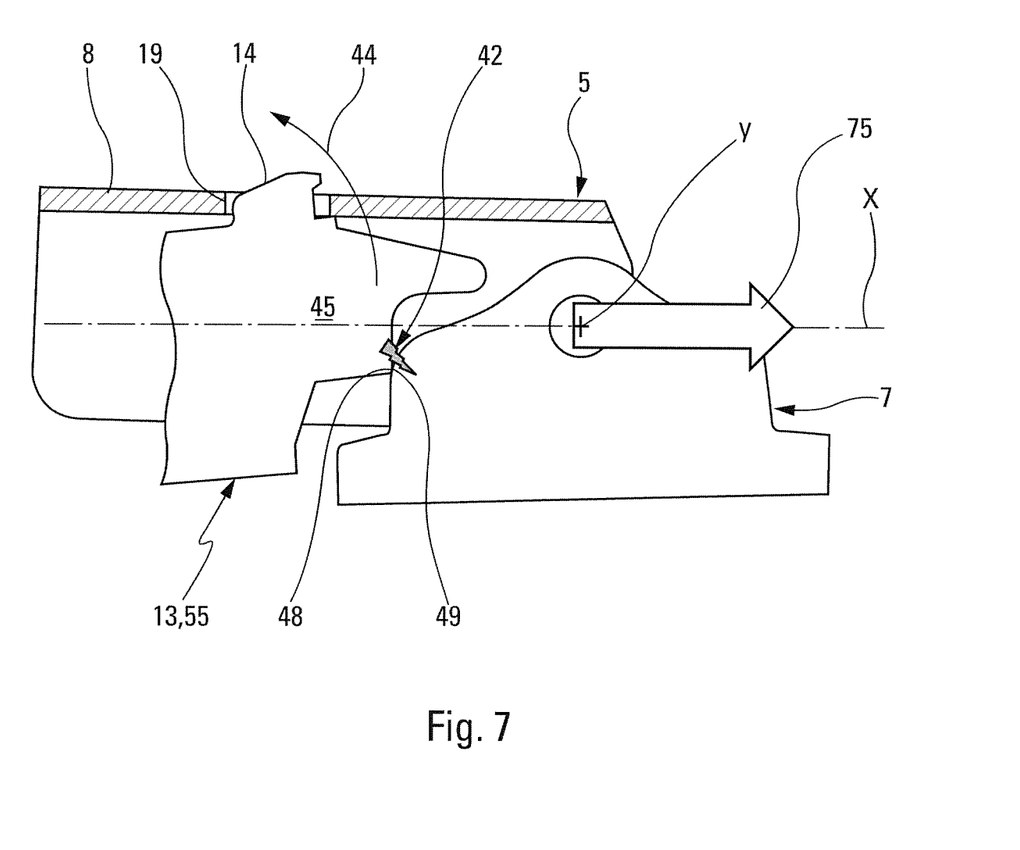

FIGS. 6 and 7 are views in longitudinal and vertical cross section observing the connecting device from a side opposite that observed in FIGS. 3 and 5. The head of the adapter is therefore located to the right of these figures. FIGS. 6 and 7 are partial in the meaning that they only show a portion of terminal part 5 of the motor arm, a portion of attachment device 13 of the adapter and connector 7. The description below relates to the second embodiment using an attachment device in the form of rear part 55 of adapter 6, but this operation is nevertheless applicable to both embodiments described above.

FIG. 6 shows how first limiting device 41 works. As terminal part 9 has no edges folded towards the interior of its inner volume, vertical force 74 can be applied to connector 7 tending to move it away from upper wall 8 of terminal part 5. This vertical force 74 is a tensile force acting on connector 7 in a direction perpendicular to the transverse Y axis about which the adapter pivots in relation to the connector and passes through at least one securing member 24 of connector 7 to attach it to the wiper. It will be understood here that this force is downward and may be at a variable angle as long as it passes through securing member 24.

Such a force gives rise to forces on rear part 55 of the adapter which tend to open up space 9 and cause damage to attachment pad 14. First limiting device 41 opposes these forces by limiting the mobility of attachment device 13 in relation to connector 7. In fact, first side 46 of tab 45 comes in contact with first surface 47 of connector 7, thus forming a stop against angular back and forth movement of rear part 55 of the adapter. It will be noted that first side 46 of tab 45 is in contact with first surface 47 of connector 7 when rear part 55 and front part 54, the latter also being otherwise known as the body of the adapter, turn through an angle of a maximum of 3° in first direction of rotation 43.

FIG. 7 shows how second limiting device 42 works. The centrifugal force acting on the wiper when the wiper system is in operation can be large. A longitudinal force 75 can act on connector 7, tending to pull the adapter from terminal part 5 of the motor arm. This longitudinal force 75 is a tensile force acting on connector 7 in a direction perpendicular to the transverse Y axis about which the adapter pivots with respect to the connector and in a direction parallel, or substantially parallel, to the longitudinal X axis in which the adapter extends.

Such a force gives rise to forces on rear part 55 of the adapter which tend to close up space 9 and cause attachment pad 14 to come out of opening 19 provided in upper wall 8 of terminal part 5. Second limiting device 41 opposes these forces by limiting movement of the attachment device in relation to connector 7. In fact, second side 48 of tab 45 comes into contact with second surface 49 of connector 7, thus forming a stop against angular back and forth movement of rear part 55 of the adapter. It will be noted that second side 48 of tab 45 is in contact with second surface 49 of connector 7 when rear part 55 and front part 54, otherwise referred to as the body of the adapter in the first embodiment, turn through an angle which is a maximum of 3°, in second direction of rotation 44.

The angle of the first direction of rotation and the angle of the second direction of rotation are measured taking a plane transverse and perpendicular to front upper wall 58 of front part 54, or upper wall 29, as a reference, depending upon the embodiment of the connecting device.

Second device 42 limiting the mobility of the attachment device also forms means for securing the attachment device which renders the adapter housed in the terminal part more mechanically secure.

The invention should not be restricted to the means and configurations described and illustrated, and it thus applies to all equivalent means or configurations and all combinations of such means.

The invention claimed is:

1. A connecting device to connect a wiper to a motor arm of the wiper, comprising:
   at least one elongated connector extending longitudinally to have opposite terminal ends and configured to be securely attached to the wiper;
   an adapter pivotally connected to the at least one connector by a pivot connection about a pivot axis to be received in a terminal part of the motor arm, the adapter comprising an attachment device which moves in rotation and is configured to immobilize the adapter in relation to the terminal part at least longitudinally; and
   a first limiting device that limits a mobility of the attachment device in a first direction of rotation and a second limiting device that limits the mobility of the attachment device in a second direction of rotation, opposite the first direction of rotation, wherein
   the attachment device comprises a tab that comprises the first limiting device and the second limiting device,
   the tab comprises a concave depression disposed between the first limiting device and the second limiting device,
   the tab, the first limiting device, and the second limiting device are parts of a monolithic structure, and
   a portion of the at least one connector is secured within the concave depression of the tab to immobilize the adapter, said portion is at one of the terminal ends and longitudinally spaced from the pivot axis.

2. The connecting device according to claim 1, wherein the adapter and the connector are connected by the pivot connection having the pivot axis transverse to a longitudinal axis of the adapter.

3. The connecting device according to claim 2, wherein the first limiting device limits the mobility of the attachment device when a tensile force is applied to the connector in relation to the terminal part in a direction perpendicular to the pivot axis and passing at least through a member for securing the connector on the wiper.

4. The connecting device according to claim 2, wherein the second limiting device limits the mobility of the attachment device when a tensile force is applied to the connector in relation to the terminal part in a direction perpendicular to the pivot axis and substantially parallel to the longitudinal axis in which the adapter extends.

5. The connecting device according to claim 1, wherein the first limiting device is formed of a first side of the tab and by a first surface delimiting the connector.

6. The connecting device according to claim 5, wherein the first side extends along a longitudinal axis of the adapter, the first surface is an upper surface of the connector provided alongside the first side.

7. The connecting device according to claim 5, wherein the second limiting device is formed by a second side of the tab which is separate from the first side, and by a second surface delimiting the connector which is separate from the first surface of the connector.

8. The connecting device according to claim 7, wherein the second side extends in a plane crossing a longitudinal axis of the adapter, the second surface being a lateral surface of the connector provided alongside the second side.

9. The connecting device according to claim 7, wherein the second side of the tab is in contact with the second surface of the connector when the attachment device and a body of the adapter are turned through an angle of at least 3°, in the second direction of rotation.

10. The connecting device according to claim 5, wherein the first side of the tab is in contact with the first surface of the connector when the attachment device and a body of the adapter are turned through an angle of at least 3°, in the first direction of rotation.

11. The connecting device according to claim 1, wherein the attachment device comprises at least one tongue articulated on a body of the adapter, and at an end of which an attachment pad is located.

12. The connecting device according to claim 11, wherein the attachment pad is configured to grip an upper wall of the terminal part of the motor arm.

13. The connecting device according to claim 12, wherein the attachment pad comprises at least one tooth extending in a plane parallel to a plane in which the tongue extends, the tooth and the tongue being configured to be located on either side and each opposite the upper wall of the terminal part of the motor arm.

14. The connecting device according to claim 12, wherein the attachment pad comprises a tooth extending in a plane parallel to a plane in which the rear upper wall extends, the tooth and the rear upper wall being configured to be located on either side and each opposite the upper wall of the terminal part of the motor arm.

15. The connecting device according to claim 1, wherein the attachment device comprises at least a rear part articulated on a front part of the adapter, the rear part and the front part having a transverse cross section in the shape of a "U", the rear part and the front part each comprising an upper wall and two side walls originating from the upper wall, an attachment pad emerging from the rear upper wall of the rear part.

16. The connecting device according to claim 15, wherein at least one rear lateral wall of the rear part is separated from a front lateral wall of the front part by at least onespace, the rear upper wall of the rear part being connected to a front upper wall of the front part by articulation means.

17. A wiper comprising a connecting device according to claim 1, wherein the connector is of one piece with an element of structure of the wiper.

18. A wiper system comprising a wiper according to claim 17; and a rotatable motor arm for the wiper, in which the adapter is housed in a terminal part of the motor arm and held at least longitudinally in this terminal part by the attachment device.

19. The wiper system according to claim 18, in which the attachment device holds the adapter in the terminal part vertically.

* * * * *